(12) United States Patent
Roh

(10) Patent No.: US 9,207,681 B2
(45) Date of Patent: Dec. 8, 2015

(54) AUTOMATIC RECOVERY METHOD FOR AN UNMANNED AERIAL VEHICLE

(75) Inventor: Eun Jung Roh, Gyengsangnam-do (KR)

(73) Assignee: KOREAN AIR LINES CO., LTD., Seoul (KR)

( * ) Notice: Subject to any disclaimer, the term of this patent is extended or adjusted under 35 U.S.C. 154(b) by 169 days.

(21) Appl. No.: 13/993,920

(22) PCT Filed: Dec. 22, 2010

(86) PCT No.: PCT/KR2010/009187
§ 371 (c)(1),
(2), (4) Date: Aug. 22, 2013

(87) PCT Pub. No.: WO2012/081755
PCT Pub. Date: Jun. 21, 2012

(65) Prior Publication Data
US 2013/0325222 A1 Dec. 5, 2013

(30) Foreign Application Priority Data
Dec. 14, 2010 (KR) ........................ 10-2010-0127276

(51) Int. Cl.
| G05D 1/00 | (2006.01) |
| G05D 1/10 | (2006.01) |
| B64C 39/02 | (2006.01) |
| G05D 1/06 | (2006.01) |
| B64F 1/02 | (2006.01) |

(52) U.S. Cl.
CPC .............. *G05D 1/101* (2013.01); *B64C 39/024* (2013.01); *G05D 1/0676* (2013.01); *B64C 2201/182* (2013.01); *B64F 1/02* (2013.01)

(58) Field of Classification Search
CPC .... B64C 39/024; G05D 1/101; G05D 1/0676; G01S 5/163
See application file for complete search history.

(56) References Cited

U.S. PATENT DOCUMENTS

| 5,235,513 A | 8/1993 | Velger |
| 5,716,032 A | 2/1998 | McIngvale |
| 9,064,222 B2* | 6/2015 | Saad ................... G06Q 10/0631 |
| 2007/0023582 A1* | 2/2007 | Steele ................... B64C 39/024 244/190 |
| 2010/0084513 A1* | 4/2010 | Gariepy ............... B64C 39/024 244/190 |
| 2010/0198514 A1* | 8/2010 | Miralles .................. F41G 7/008 701/302 |
| 2012/0050525 A1* | 3/2012 | Rinner .................. G06T 7/0028 348/117 |
| 2012/0210853 A1* | 8/2012 | Aberschitz ................ B64F 1/04 89/1.11 |
| 2014/0192193 A1* | 7/2014 | Zufferey .............. G05D 1/0094 348/144 |
| 2015/0051758 A1* | 2/2015 | Cho .......................... G01S 1/00 701/16 |

FOREIGN PATENT DOCUMENTS

| KR | 10-0842101 B1 | 6/2008 |
| KR | 10-0985195 B1 | 9/2010 |

* cited by examiner

*Primary Examiner* — Jonathan M Dager
(74) *Attorney, Agent, or Firm* — Rabin & Berdo, P.C.

(57) ABSTRACT

A vision-based automatic recovery method including steps of: generating a reference trajectory connecting an align point and a recovery point that is provided through wireless communication; taking an image containing a target through a front vision camera, determining a position and a size of the target in the taken image, and calculating a distance between the target and the unmanned aerial vehicle; generating an attitude command for changing a direction of the unmanned aerial vehicle so as to center the target in an image taken by the front vision camera; and generating a virtual trajectory by combining the generated reference trajectory and the generated attitude command, a weight of the attitude command being increased as the unmanned aerial vehicle moving from the align point to the recovery point.

7 Claims, 8 Drawing Sheets

AUTOMATIC RECOVERY METHOD FOR AN UNMANNED AERIAL VEHICLE

TECHNICAL FIELD

The present invention relates to an automatic recovery method for an unmanned aerial vehicle (UAV), and more particularly to a vision-based automatic recovery method for an unmanned aerial vehicle (UAV) using a reference trajectory, in which information from a front vision camera and information from navigation equipment embedded in the unmanned aerial vehicle are combined by a weighting method.

BACKGROUND ART

An unmanned aerial vehicle makes a flight based on an automatic algorithm, and thus has to automatically take off and land to achieve a perfect automatic system. In case of mountainous areas, a distance required for landing is so short that methods usable for recovery are limited. However, there is no automatic recovery method of using a net to effectively recover the unmanned aerial vehicle within a short distance in the existing research.

The net recovery needs a higher degree of precision than other recovery methods because a recovery point and range are set to be about 2~3 times larger than the size of a flight vehicle. If a differential global positioning system (DGPS), a laser and radar are used, it is possible to ensure high precision. However, topographical conditions of mountainous area are improper to use a signal of the DGPS, and a method of using the laser or radar is also disadvantageous since a construction cost is high and self technology development is difficult even though it has high precision.

Also, a method of using vision information has advantages that construction and development costs are low and precision within a short distance is high. However, in the case of using only the vision information, it is disadvantageously difficult to control an altitude because only a relative location and a distance are used.

Further, there is a method of employing a reference trajectory. In the case of using the reference trajectory, it is advantageously possible to maintain an altitude optimized for flying toward an aiming point because an optimum path of connecting given start and end points is generated and traced. However, it is disadvantageously difficult for the net recovery to provide such high precision since the recovery point and range are set to be about 2~3 times larger than the size of a fight vehicle.

DISCLOSURE

Technical Problem

The present invention is conceived to solve the foregoing problems, and an aspect of the present invention is to provide a vision-based automatic recovery method using a reference trajectory, in which both vision information and the reference trajectory are used. That is, the reference trajectory connecting a recovery point and an align point given by a wind direction and a mission is generated. Then, the reference trajectory is followed based on information from navigation equipment in an initial recovery section (between the align point and the recovery point), and a weight of a generated command is increased based on the vision information having a higher precision as getting closer to the recovery point. Accordingly, it is possible to use both the advantage of using the reference trajectory and the advantage of using the vision information.

Technical Solution

In accordance with one aspect of the present invention, there is provided a vision-based automatic recovery method using a reference trajectory for an unmanned aerial vehicle, the method comprising: a reference trajectory generating step of generating the reference trajectory connecting an align point and a recovery point on an on-board based on the recovery point given to the unmanned aerial vehicle through wireless communication; an image processing step of taking an image containing a symbol (e.g., a net) through a front vision camera embedded in the unmanned aerial vehicle, determining the position and size of the symbol in the taken image through image processing computer, and calculating a distance between the symbol and the unmanned aerial vehicle; an attitude command issuing step of generating an attitude command for centering the symbol at the center of the image by using position of the symbol in the obtained image; and a virtual trajectory generating step of generating a virtual trajectory by combining the reference trajectory generated in the reference trajectory generating step and the attitude command generated in the attitude command generating step, in which the virtual trajectory is generated by moving a weight to the attitude command as going from the align point to the recovery point.

Here, the reference trajectory may be set up to pass one or more waypoints from the align point to the recovery point, in which a virtual reference trajectory for going toward the next waypoint is generated before passing each waypoint, and a guide control command is issued to follow the generated virtual reference trajectory based on information of embedded navigation equipment.

Also, the attitude command may be a command to calculate the azimuth angle $\psi_{VPUCmd}$ and the elevation angle $\theta_{VPUCmd}$ between the positions of the symbol in the center of the taken image, and change a direction of the unmanned aerial vehicle as much as the calculated azimuth angle $\psi_{VPUCmd}$ and elevation angle $\theta_{VPUCmd}$.

Further, the moving the weight in the virtual trajectory generating step may include linearly increasing weight of the attitude command from 0% to 100% as going from the align point to the recovery point.

Also, distance calculation for moving the weight in the virtual trajectory generating step may use a distance between the symbol and the unmanned aerial vehicle calculated in the image processing step.

Further, the generation of the virtual trajectory may improve precision by following the reference trajectory through navigation information in an initial align section and generating an attitude command based on high-precise image information in a final section, i.e., at the recovery point.

Advantageous Effects

In accordance with an aspect of the present invention, there is provided a vision-based automatic recovery method using a reference trajectory, in which both vision information and the reference trajectory are used.

That is, the reference trajectory connecting a recovery point and an align point given by a wind direction and a mission is generated. Then, the reference trajectory is followed based on information from navigation equipment in an initial recovery section (between the align point and the recovery point), and a weight of a generated command is increased based on the vision information having a higher precision as getting closer to the recovery point. Accordingly, both the advantage of using the reference trajectory and the advantage of using the vision information are used to thereby enable the automatic recovery with higher precision for the unmanned aerial vehicle.

BEST MODE

Figure 1:
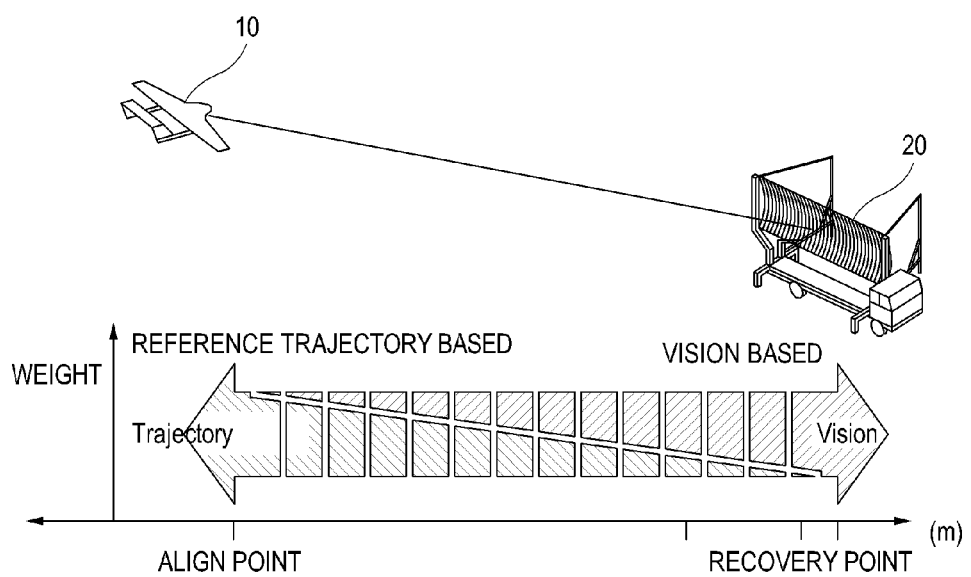
FIG. 1 is a schematic view for explaining a recovery method for an unmanned aerial vehicle based on a reference trajectory and vision according to an embodiment of the present invention.

Hereinafter, exemplary embodiments according to the present invention will be described in detail with reference to accompanying drawings. Prior to this, terms or words used in this specification and claims have to be interpreted as the meaning and concept adaptive to the technical idea of the present invention rather than typical or dictionary interpretation on a principle that an inventor is allowed to properly define the concept of the terms in order to explain his/her own invention in the best way.

Therefore, because embodiments disclosed in this specification and configurations illustrated in the drawings are nothing but preferred examples of the present invention and do not fully describe the technical idea of the present invention, it will be appreciated that there are various equivalents and alterations replacing them at a filing date of the present application.

An unmanned aerial vehicle makes a flight based on an automatic algorithm, and thus has to automatically take off and land to achieve a perfect automatic system. In case of mountainous areas, a distance required for landing is so short that methods usable for recovery are limited. However, there is no automatic recovery method of using a net to effectively recover the unmanned aerial vehicle within a short distance in the existing research.

The net recovery needs a higher degree of precision than other recovery methods because a recovery point and range are set to be about 2~3 times larger than the size of a flight vehicle. If a differential global positioning system (DGPS), a laser and radar are used, it is possible to ensure high precision. However, topographical conditions of mountainous area are improper to use a signal of the DGPS, and a method of using the laser or radar is also disadvantageous since a construction cost is high and self technology development is difficult even though it has high precision.

A method of using vision information has advantages that construction and development costs are low and precision within a short distance is high. However, in the case of using only the vision information, it is difficult to control an altitude because only a relative location and a distance are used. To solve such shortcomings, an embodiment of the present invention proposes a method of using a reference trajectory. In the case of using the reference trajectory, it is possible to maintain an altitude optimized for flying toward an aiming point because an optimum path of connecting given start and end points is generated and traced.

Figure 2:
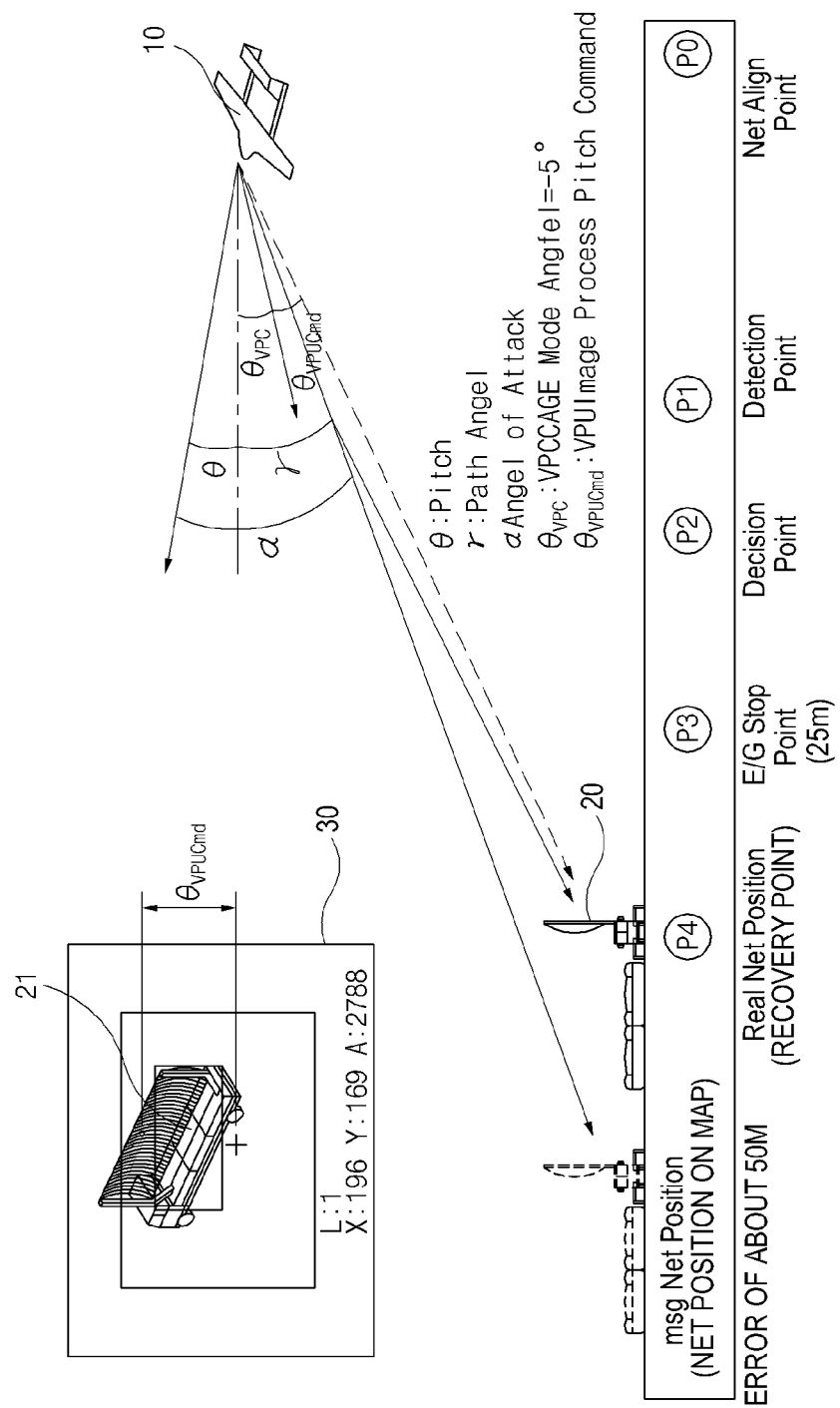
FIG. 2 is a reference view showing an example of a vision-based automatic recovery scenario according to an embodiment of the present invention.

As shown in FIGS. 1 and 2, in a vision-based automatic recovery using a reference trajectory, the reference trajectory connecting a recovery point and an align point given by a wind direction and a mission is generated. Then, the reference trajectory is followed based on information from navigation equipment in an early recovery section (between the align point and the recovery point), and a weight of a generated command is increased based on the vision information having a higher precision as getting closer to the recovery point. At this time, a weight value is varied depending on distances, and thus the distance is also calculated together using an obtained image.

Further, as shown in FIG. 2, an internal pilot determines a landing possible point, i.e., a net position on a map. At this time, a position error is about 50 m. This position is wirelessly transmitted to the unmanned aerial vehicle, and an embedded flight control computer is used to determine a net align point P0 and generate the reference trajectory connecting with it. A vision detecting point P1 is positioned on this reference trajectory, and the weighting factor is increased regarding this point as a base point (P1). As getting closer to a recovery point P4, precision of vision information becomes higher. Therefore, at a decision point P2 (decision about recovery or abort), it is possible to know a real recovery point P4 (i.e., the net position), and an abort maneuver is automatically carried out if vision recognition is unstable or a calculation error is greater than a preset value.

Figure 8:
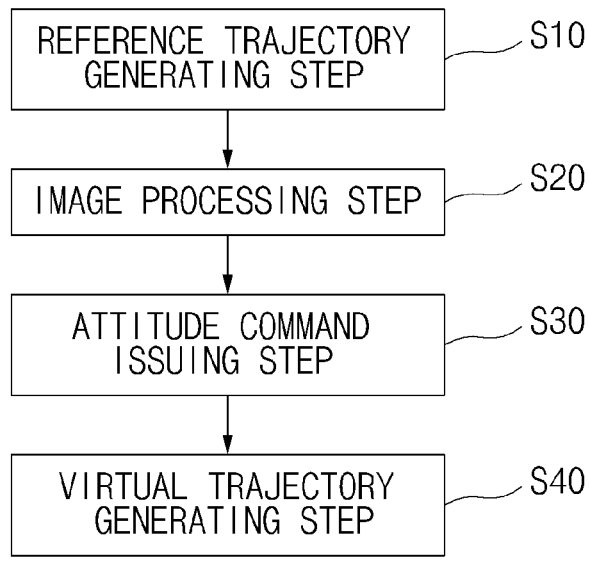
FIG. 8 is a block diagram of carrying out the vision-based automatic recovery method for the unmanned aerial vehicle through the reference trajectory according to an embodiment of the present invention.

As shown in FIG. 8, the vision-based automatic recovery method using the reference trajectory for the unmanned aerial vehicle according to an embodiment of the present invention includes steps of generating the reference trajectory (S10), image processing (S20), generating an attitude command (S30) and generating the virtual trajectory (S40).

According to an embodiment of the present invention, a front vision camera, image processing computer and the flight control computer are needed as basic hardware, and algorithms for generating the reference trajectory, processing the obtained image, generating a control command, etc. are required as software, which will be described later.

The step S10 of generating the reference trajectory includes generating the reference trajectory connecting the align point and the recovery point for recovering the unmanned aerial vehicle.

An initial guidance algorithm for performing the vision-based automatic recovery is to generate the reference trajectory passing the respective points P0, P1, P2, P3 and P4 of FIG. 2 and thus issue guidance command for following the trajectory. At this time, an algorithm for preventing the flight from leaving out of the reference trajectory while going toward the next waypoint via each waypoint. In particular, if a flying altitude is lower than a desired altitude as the waypoint is changed while the altitude descends during the automatic recovery, danger of ground collision may occur. To prevent this, a new reference trajectory for going toward the next waypoint is generated before passing the waypoint, and guidance command for following this new reference trajectory is issued.

That is, the reference trajectory is set up to pass one or more waypoints from the align point to the recovery point, in which a virtual reference trajectory for going toward the next waypoint is generated before passing each waypoint, and control command is issued to follow the generated virtual reference trajectory.

Figure 3:
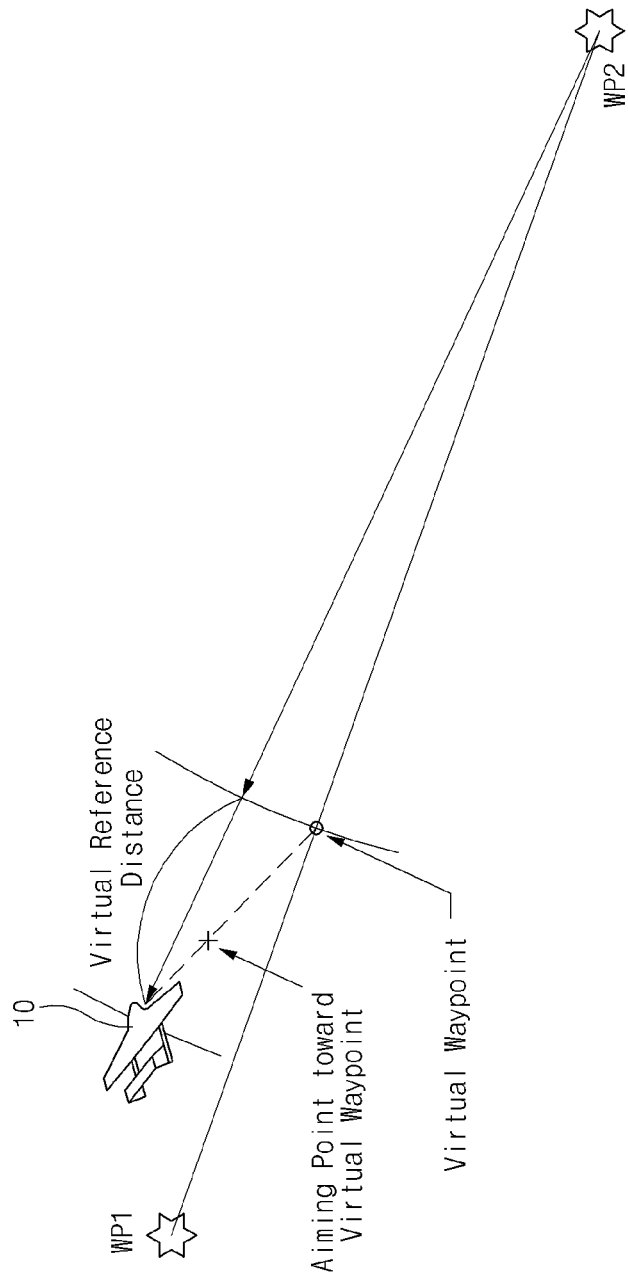
FIG. 3 is a concept view where a virtual reference trajectory is generated according to an embodiment of the present invention.

As shown in FIG. 3, the virtual reference trajectory is generated to trace the reference trajectory connecting the waypoints so as to trace a real reference trajectory. The virtual reference trajectory is generated by setting up the virtual waypoint on the reference trajectory so that a certain distance (i.e., a virtual reference distance) can be left from a remaining distance between the unmanned aerial vehicle (10) and an aiming waypoint.

Figure 4:
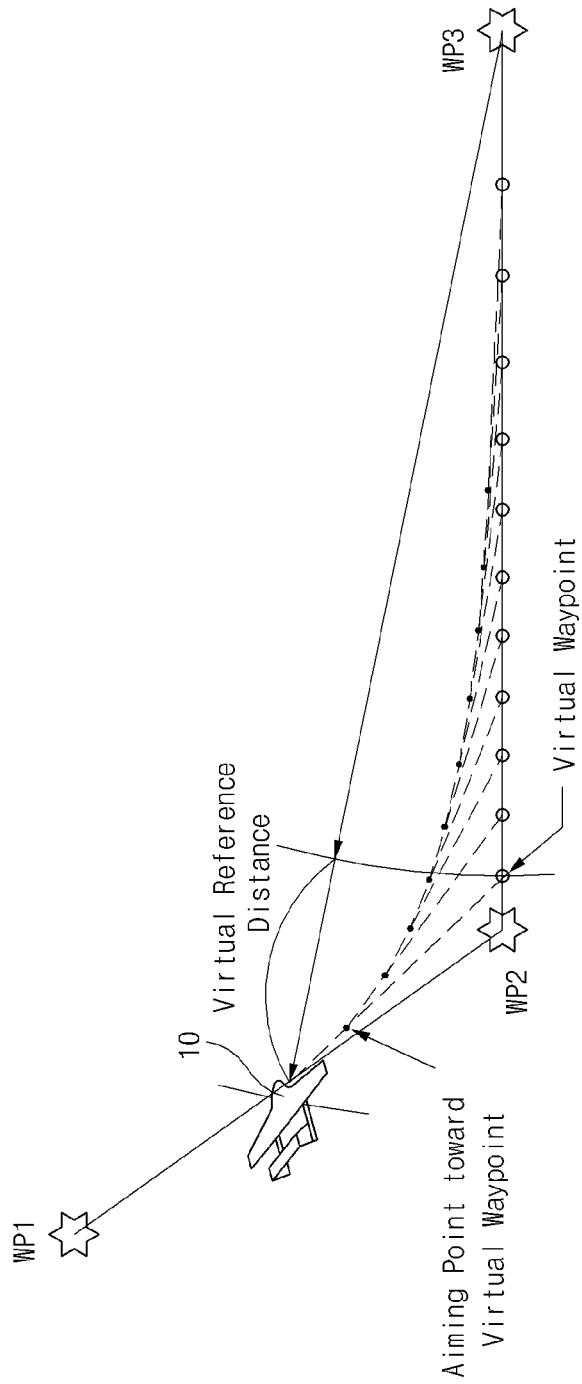
FIG. 4 is a concept view showing change in a waypoint through a virtual reference trajectory according to an embodiment of the present invention.

As shown in FIG. 4, a changed waypoint is generated using the virtual reference trajectory. At this time, the virtual reference trajectory forms a smooth curve with reference to the changed waypoint, thereby preventing the flight from leaving out of the reference trajectory while changing the waypoint.

Figure 5:
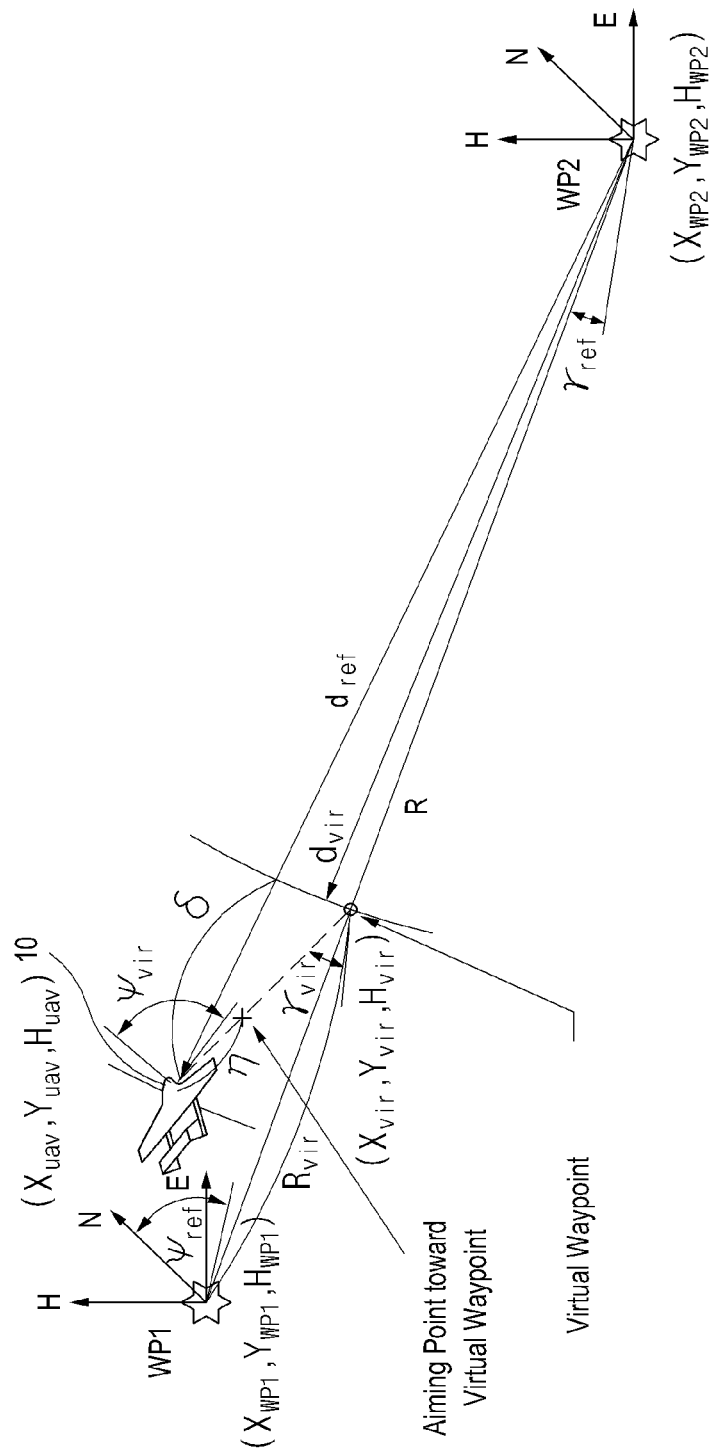
FIG. 5 is a view of defining variables for calculating the virtual the waypoint according to an embodiment of the present invention.

As shown in FIG. 5, variables are defined to calculate the virtual waypoint. In this embodiment, it will be described that the waypoint is changed using the virtual reference trajectory and the flying path of the unmanned aerial vehicle is set up.

If the position of each waypoint is known in an inertial coordinate system, R and $d_{ref}$ can be calculated as shown in the following expression (1). A setup variable of $\delta$ is used to calculate $d_{vir}$ so that $R_{vir}$ can be obtained.

$$R = \sqrt{(X_{WP2}-X_{WP1})^2+(Y_{WP2}-Y_{WP1})^2+(H_{WP2}-H_{WP1})^2}$$

$$d_{ref} = \sqrt{(X_{WP2}-X_{uav})^2+(Y_{WP2}-Y_{uav})^2+(H_{WP2}-H_{uav})^2} \quad \text{Expression (1)}$$

$$d_{vir} = d_{ref} - \delta$$

$$R_{vir} = R - d_{vir} \quad \text{Expression (2)}$$

To calculate the virtual waypoint on the reference trajectory, an azimuth angle $\psi_{ref}$ and a path angle $\gamma_{ref}$ of the reference trajectory are obtained as follows.

$$\psi_{ref} = \frac{\pi}{2} - \tan^{-1}\left(\frac{X_{WP2}-X_{WP1}}{Y_{WP2}-Y_{WP1}}\right) \quad \text{Expression (3)}$$

$$\gamma_{ref} = \tan^{-1}\left(\frac{H_{WP2}-H_{WP1}}{\sqrt{(X_{WP2}-X_{WP1})^2+(Y_{WP2}-Y_{WP1})^2}}\right) \quad \text{Expression (4)}$$

In result, the coordinates of the virtual waypoint can be calculated using the following expression (5).

$$X_{vir} = X_{WP1} + R_{vir} \cos\psi_{ref} \cos\gamma_{ref}$$

$$Y_{vir} = Y_{WP1} + R_{vir} \sin\psi_{ref} \cos\gamma_{ref}$$

$$H_{vir} = H_{WP1} + R_{vir} \sin\gamma_{ref} \quad \text{Expression (5)}$$

The guidance command for flying toward the virtual waypoint on the reference trajectory is issued to thereby trace the reference trajectory. The guidance command for flying toward the virtual waypoint is generated by setting an aiming point between the current position of the unmanned aerial vehicle and the virtual waypoint and using the altitude and azimuth angle of the aiming point. Let a distance from the unmanned aerial vehicle to the aiming point be $\eta$. Then, the position of the aiming point can be calculated using the expressions (6) and (7).

$$\psi_{vir} = \frac{\pi}{2} - \tan^{-1}\left(\frac{X_{vir}-X_{uav}}{Y_{vir}-Y_{uav}}\right) \quad \text{Expression (6)}$$

$$\gamma_{vir} = \tan^{-1}\left(\frac{H_{vir}-H_{uav}}{\sqrt{(X_{vir}-X_{uav})^2+(Y_{vir}-Y_{uav})^2}}\right) \quad \text{Expression (7)}$$

The positions $(X_{aim}, Y_{aim}, H_{aim})$ of the aiming point are as shown in the following expression (8).

$$X_{aim} = X_{uav} + \eta \cos\psi_{vir} \cos\gamma_{vir}$$

$$Y_{aim} = Y_{uav} + \eta \sin\psi_{vir} \cos\gamma_{vir}$$

$$H_{aim} = H_{uav} + \eta \sin\gamma_{vir} \quad \text{Expression (8)}$$

Since the positions $(X_{aim}, Y_{aim}, H_{aim})$ of the aiming point is calculated in the expression (8) and the azimuth angle $\psi_{vir}$ of the virtual reference trajectory is calculated in the expression (6), these values are applied as guidance commands for the controller. At this time, a velocity command may be set up to maintain an initial entry velocity for landing.

$$\psi_{vir} \rightarrow \psi_{cmd}, H_{aim} \rightarrow H_{cmd}, V_{initial} \rightarrow V_{cmd} \quad \text{Expression (9)}$$

The step S20 of image processing includes taking an image containing a symbol (i.e., net) through the front vision camera provided in the unmanned aerial vehicle, determining the position and size of the symbol in the taken image through image processing computer, and calculating a distance between the unmanned aerial vehicle and the symbol.

Figure 6:
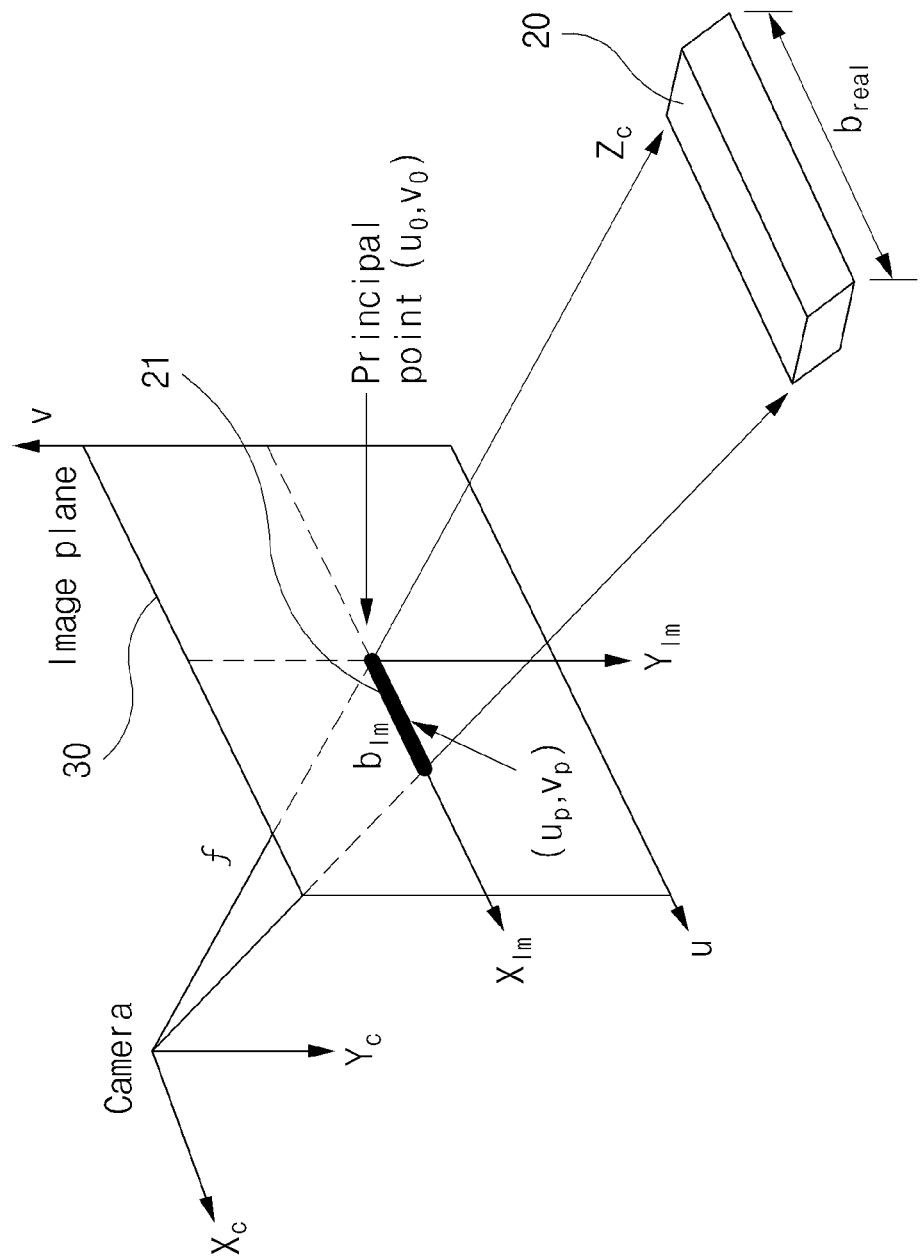
FIG. 6 is a view of defining variables for processing an image taken by a front vision camera according to an embodiment of the present invention.

As shown in FIG. 6, only a concerned area is processed in the image taken by the front vision camera provided in the unmanned aerial vehicle, and binarized with respect to color components of the symbol (i.e., the net in the taken image). Noise of the image is removed through a filter, leaving only the symbol in the binary image. In the image, the center position $(u_p, v_p)$ and size $b_{im}$ of the symbol are calculated by the following expressions (10) and (11).

$$u_p = \frac{\sum x_i}{\text{Area}}, \quad v_p = \frac{\sum y_i}{\text{Area}} \quad \text{Expression (10)}$$

$$b_{im} = \max\_x - \min\_x \quad \text{(Expression (11))}$$

Here, $(u_p, v_p)$ is the position of the symbol in the image, which can be obtained by taking the number of extracted pixels and the area into account. Also, the $b_{im}$ is the size of symbol, which can be obtained by x or y coordinate values of the rightmost pixel and the leftmost pixel because the symbol has a symmetrical shape. Using the position and size of the symbol, it is possible to obtain the center position of the net in accordance with distances, thereby issuing an align command (i.e., an attitude command) for the unmanned aerial vehicle.

Figure 7:
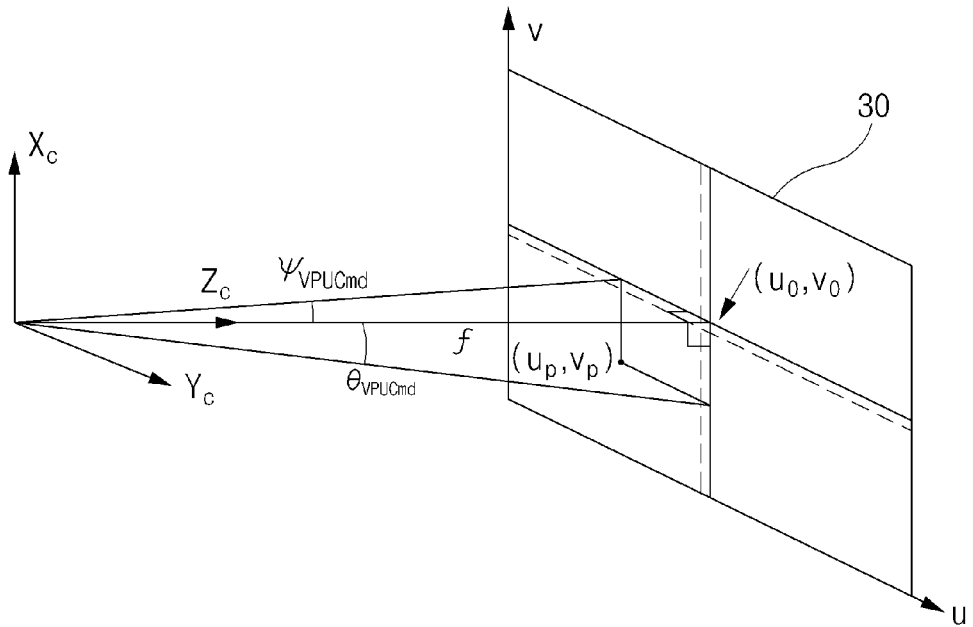
FIG. 7 is a view showing an example of measuring azimuth and elevation viewing angles of a symbol (i.e. a net) according to an embodiment of the present invention.

As shown in FIG. 7, if calibration is performed to grasp a relationship between an image taken by the camera and a real object, it is possible to obtain an intrinsic matrix about the characteristic of the camera as shown in the following expression (12) (using a general calibration matrix).

$$A = \begin{bmatrix} k_u f & \gamma & u_0 \\ 0 & k_v f & v_0 \\ 0 & 0 & 1 \end{bmatrix} \quad \text{Expression (12)}$$

where $k_u f$, $k_v f$ refers to a scale factor, which means a focal distance (f) in FIG. 7, and $\gamma$ and (u,v) refer to a degree of distortion and a center point, respectively. Due to the characteristics of the camera, the center of the taken image is not equal to the center of the camera, and thus the center points have to be corrected during the image processing step.

The characteristics of the camera obtained in the expression (12) are used in obtaining azimuth and elevation viewing angles and a position of the symbol of the unmanned aerial vehicle. As shown in the following expression (13), it is possible to obtain the azimuth angle $\psi_{VPUCmd}$ and an elevation angle $\theta_{VPUCmd}$. If the size $b_{im}$ of the symbol is known, a distance $Z_c$ to the symbol can be obtained by the following expression (14).

$$\psi_{VPUCmd} = \tan^{-1}\left(\frac{u_p - u_0}{k_u f}\right) \quad \text{Expression (13)}$$

$$\theta_{VPUCmd} = \tan^{-1}\left(\frac{v_p - v_0}{k_v f}\right)$$

$$Z_C = \frac{b_{real} k_v f}{b_{im}} \quad \text{Expression (14)}$$

The step S30 of issuing an attitude command is to generate an attitude command for positioning the symbol on the center of the image taken in the image processing step S20. This step includes calculating the azimuth angle $\psi_{VPUCmd}$ and the elevation angle $\theta_{VPUCmd}$ between the positions of the symbol in the center of the taken image through the foregoing expressions (13) and (14), and issuing a command to change the direction of the unmanned aerial vehicle as much as the calculated azimuth angle $\psi_{VPUCmd}$ and elevation angle $\theta_{VPUCmd}$.

The step S40 of generating the virtual trajectory is to generate the virtual trajectory by combining the reference trajectory generated in the reference trajectory generating step and the attitude command generated in the attitude command generating step, in which the virtual trajectory is generated by increasing a weight to the attitude command as going from the align point to the recovery point.

Here, there are various methods of moving the weight in the virtual trajectory generating step. For example, weight of the attitude command may be linearly increased from 0% to 100% or be exponentially increased as going from the align point to the recovery point, but not limited thereto. That is, a distance that the unmanned aerial vehicle travels between the align point and the recovery point corresponds to a difference in the weight of the attitude command, and the ratio of the difference to the distance is the same for any distance that the unmanned aerial vehicle travels. Alternatively, various combinations or methods are possible.

Further, the distance calculation for moving the weight in the virtual trajectory generating step may be based on the distance between the symbol and the unmanned aerial vehicle calculated in the image processing step.

An embodiment of the present invention is for high precision and stable control as a proper weighting factor is applied to reference trajectory and image processing results in accordance with the distance between the unmanned aerial vehicle and the recovery point. In this embodiment, each algorithm is continuously calculated, and it is determined in a weighting function at the end which algorithm is more reliable. According to an embodiment of the present invention, a linear weighting function, which is very simple and is capable of giving a weight to the distance, is employed. The following expression (15) is to give a weight for generating a final control command.

$$B_{cmd} = \quad \text{Expression (15)}$$
$$W \cdot B_{TRHCmd} + (I - W)(B_{VPUCmd} + (B_{trim} + B_{VPC})),$$
$$B = \begin{bmatrix} \theta \\ \phi \end{bmatrix}, W = \begin{bmatrix} w_1 & 0 \\ 0 & w_2 \end{bmatrix}$$

where, W and I-W are weighting functions, sum of which is 1. B multiplied with the weighting function is a matrix consisting of an elevation and an azimuth angle, in which $B_{TRIcmd}$ of the initial term refers to the attitude command generated to follow the reference trajectory through navigation information, and $B(B_{VPUCmd}+(B_{trim}+B_{VPC}))$ of the last term refers to combination of the attitude command generated using vision information, a command considering characteristics of a flight vehicle and a correction command due to installation of an image processing camera.

With this combination, the intrinsic characteristic of the flight vehicle is reflected, and an error that may occur due to the installation or features of the image processing camera is canceled, thereby enabling more precise control.

Figure 9:
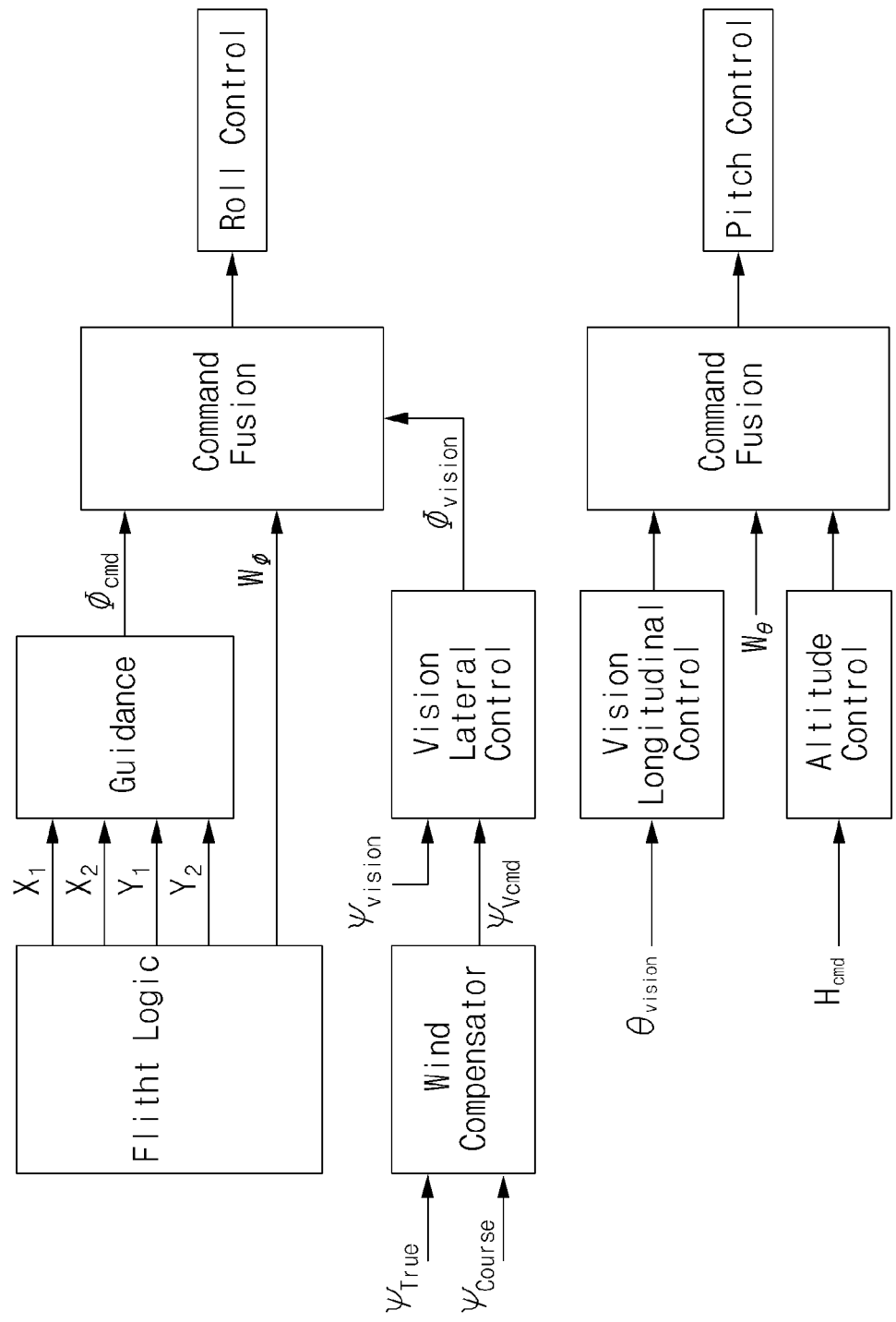
FIG. 9 is a block diagram showing a principle of generating an attitude control command of a flight vehicle according to an embodiment of the present invention.

Further, as shown in FIG. 9, the velocity and direction of wind may be estimated to issue a lateral attitude command so that effects of lateral wind that may suddenly occur in a last section can be removed.

Although some embodiments have been described herein with reference to the accompanying drawings, it will be understood by those skilled in the art that these embodiments are provided for illustration only, and various modifications, changes, alterations and equivalent embodiments can be made without departing from the scope of the present invention. Therefore, the scope and spirit of the present invention should be defined only by the accompanying claims and equivalents thereof.

The invention claimed is:

1. A vision-based automatic recovery method using a reference trajectory for an unmanned aerial vehicle, the method comprising:

a reference trajectory generating step of generating, using a computer of the unmanned aerial vehicle, the reference trajectory connecting an align point and a recovery point that is provided to the unmanned aerial vehicle through wireless communication;

an image processing step of taking an image containing a target through a front vision camera embedded in the unmanned aerial vehicle, determining a position and a size of the target in the taken image through an image processing computer of the unmanned aerial vehicle, and calculating a distance between the target and the unmanned aerial vehicle;

an attitude command issuing step of generating an attitude command for changing a direction of the unmanned aerial vehicle so as to center the target in an image taken by the front vision camera; and a virtual trajectory generating step of generating a virtual trajectory by combining the reference trajectory generated in the reference trajectory generating step and the attitude command generated in the attitude command generating step, a weight of the attitude command being gradually linearly increased in the virtual trajectory generating step as the unmanned aerial vehicle moves from the align point to the recovery point.

2. The method according to claim 1, wherein the reference trajectory is set up to pass one or more waypoints from the align point to the recovery point, in which a virtual reference trajectory for going from each waypoint toward one of the waypoints next to said each waypoint is generated before passing said each waypoint, and a guide control command is issued to follow the generated virtual reference trajectory based on information of embedded navigation equipment.

3. The method according to claim 1, wherein the attitude command comprises a command to calculate the azimuth angle $\psi_{VPUCmd}$ and the elevation angle $\theta_{VPUCmd}$ between the position of the target and a center of the taken image, and change the direction of the unmanned aerial vehicle according to the calculated azimuth angle $\psi_{VPUCmd}$ and elevation angle $\theta_{VPUCmd}$.

4. The method according to claim 1, wherein the weight of the attitude command is linearly increased from 0% to 100% as the unmanned aerial vehicle moves from the align point to the recovery point.

5. The method according to claim 1, wherein the weight of the attitude command is increased using the distance between the target and the unmanned aerial vehicle calculated in the image processing step.

6. The method according to claim 1, wherein the generation of the virtual trajectory improves precision by following the reference trajectory through navigation information in an initial align section and generating an attitude command based on high-precise image information in a final section at the recovery point.

7. The method according to claim 1, wherein a distance that the unmanned aerial vehicle travels corresponds to a difference in the weight of the attitude command, a ratio of the difference in the weight to the distance being the same for any distance that the unmanned aerial vehicle travels between the align point and the recovery point.

\* \* \* \* \*